(12) United States Patent
Krishnamachari

(10) Patent No.: US 7,123,658 B2
(45) Date of Patent: Oct. 17, 2006

(54) SYSTEM AND METHOD FOR CREATING MULTI-PRIORITY STREAMS

(75) Inventor: Santhana Krishnamachari, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 799 days.

(21) Appl. No.: 09/877,344

(22) Filed: Jun. 8, 2001

(65) Prior Publication Data
US 2003/0009764 A1 Jan. 9, 2003

(51) Int. Cl.
*H04N 7/12* (2006.01)
(52) U.S. Cl. .................. 375/240.27; 348/416
(58) Field of Classification Search ........... 375/240.16, 375/240.14, 240.27, 240.24, 240.18; 348/384, 348/409, 412, 415, 423, 419, 416, 420, 402, 348/426; 725/87
See application file for complete search history.

(56) References Cited

U.S. PATENT DOCUMENTS

| | | | | |
|---|---|---|---|---|
| 5,455,629 A * | 10/1995 | Sun et al. | ................ | 348/466 |
| 6,025,888 A * | 2/2000 | Pauls | .................. | 348/845.1 |
| 6,104,757 A * | 8/2000 | Rhee | ................ | 375/240 |
| 6,414,972 B1 * | 7/2002 | Hasgai et al. | ............. | 370/532 |
| 2002/0057705 A1 * | 5/2002 | Hagai et al. | ............. | 370/410 |

* cited by examiner

*Primary Examiner*—Mehrdad Dastouri
*Assistant Examiner*—Behrooz Senfi
(74) *Attorney, Agent, or Firm*—Larry Liberchuk

(57) ABSTRACT

A system and method for creating multi-priority streams of compressed video data. Included is a method for assigning priority to streams of compressed video data, comprising the steps of: determining a relative importance of each macroblock in a video frame based on how often each macroblock acts as a reference macroblock; and prioritizing each of the macroblocks in the video frame based on the relative importance.

25 Claims, 3 Drawing Sheets

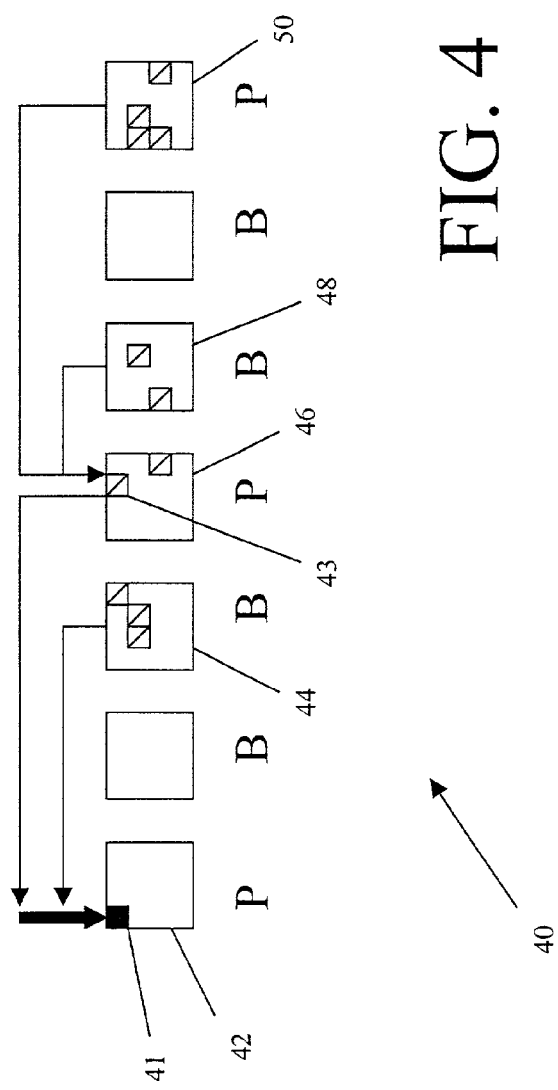
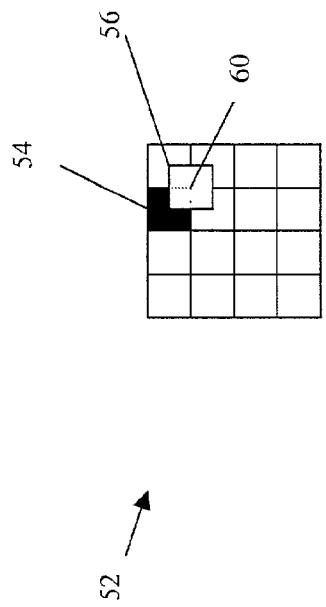
FIG. 4
FIG. 5

SYSTEM AND METHOD FOR CREATING MULTI-PRIORITY STREAMS

BACKGROUND OF THE INVENTION

1. Technical Field

The present invention relates generally to systems for processing compressed video data, and more particularly to a system and method for dividing MPEG video data into multiple streams of different priority.

2. Related Art

As the demand for the on-line delivery of video applications continues to grow and transmission bandwidth remains at a premium, the ability to provide highly efficient transmission schemes has become indispensable. One such scheme involves dividing MPEG coded video data into multiple streams, each having a different priority. This type of scheme, referred to herein as "multi-priority streams," allows different portions of the video data to consume different amounts of bandwidth, depending on the importance of the particular portion.

One specific scenario where multi-priority streams are useful involves applications that utilize transmission channels susceptible to errors. In these cases, it is necessary to protect the data with additional error protection bits, which may for example provide a certain amount of redundancy. Unfortunately, the inclusion of error protection bits creates additional overhead in terms of bandwidth consumption. By dividing MPEG data into a plurality of streams of differing priorities, individual streams can be assigned different levels of error protection. Accordingly, high priority streams can receive a greater amount of error protection than lower priority streams. Thus, overhead can be balanced with the corresponding priority of the streams.

A second scenario where multi-priority streams are useful involves networks that offer multiple quality of service (QoS) options. In such a case, different levels of quality of service for transmitted data are made available by the underlying transport. Thus, in order to efficiently utilize such a system, it is necessary to divide the video data into streams of differing priority, and then send each stream over the connection offering the appropriate QoS.

Unfortunately, existing methods of creating multi-priority streams for MPEG video are limited. For example, one approach is to divide the bitstream into different priorities based on the type of frame. In particular, since for picture quality I frames are generally more important than P frames, and P frames are generally more important than B frames, I frames receive a highest priority, P frames receive a medium priority, and B frames receive a lowest priority. However, because the actual size of a typical I or P frame can be hundreds of thousands of bits, this type of prioritization provides only marginal results since only three priority levels can be implemented. Moreover, there can be a large amount of variation in terms of importance between two I frames, or two P frames, and such variations are not taken into account in the above scheme. Thus, a need exists to create a finer prioritization among and between frames.

A second approach for creating multi-priority streams for MPEG video is to create scalable video that contains a base layer and one or more enhancement layers. The base layer is assigned a higher priority than the enhancement layers. The drawback of this approach is the increased complexity required for encoding and decoding, and the need to transcode the already coded non-scalable bitstream into a scalable bitstream.

Accordingly, a system is required: (1) that can provide a finer prioritization than the I, P and B frame prioritization; and (2) that can directly process a coded bitstream without incurring the complexity of a system that utilizes scalable video.

SUMMARY OF THE INVENTION

This invention overcomes the above-mentioned problems, as well as others, by providing a system and method for prioritizing streams of compressed video data suitable for transmission over a multi-priority transmission channel. In a first aspect, the invention provides a method for assigning priority to streams of compressed video data, comprising the steps of: determining a relative importance of each macroblock in a video frame based on how often each macroblock acts as a reference macroblock; and prioritizing each of the macroblocks in the video frame based on the relative importance.

In a second aspect, the invention comprises a method for assigning priority to streams of compressed video data, comprising the steps of: determining an importance value for each macroblock in a plurality of video frames based on how often each macroblock acts as a reference macroblock; grouping macroblocks into sets of macroblocks, and combining the importance values of the macroblocks within each set; and prioritizing each set of macroblocks based on the combined importance values.

In a third aspect, the invention provides a system for prioritizing streams of compressed video data, comprising: a system for determining an importance value for each macroblock in a video frame based on how often each macroblock acts as a reference macroblock; and a system for prioritizing each of the macroblocks in the video frame based on the importance value determined for each macroblock.

In a fourth aspect, the invention provides a system for prioritizing streams of compressed video data, comprising: a system for determining an importance value for each macroblock in a plurality of video frames based on how often each macroblock acts as a reference macroblock; a system for grouping macroblocks into sets of macroblocks and combining the importance values for macroblocks in each set; and a system for prioritizing sets of macroblocks based on the combined importance values.

In a fifth aspect, the invention provides a decoder system for decoding multi-priority compressed video data, comprising: a system that correlates an error protection scheme to each of a plurality of data streams; and a system that interprets each data stream based on the error protection scheme; wherein the error protection scheme is determined by a prioritization system that prioritizes each data stream based on how often macroblocks act as reference macroblocks.

In a sixth aspect, the invention provides a program product stored on a recordable media, that when executed, prioritizes streams of compressed video data, the program product comprising: means for determining an importance value for macroblock data in video frames based on how often each of a plurality of macroblocks act as reference macroblocks; and means for prioritizing macroblock data based on the determined importance values.

In a further aspect, each of the prioritization systems and methods described above may further include a system for assigning different error protection schemes to streams of different priority.

BRIEF DESCRIPTION OF THE DRAWINGS

The preferred exemplary embodiment of the present invention will hereinafter be described in conjunction with the appended drawings, where like designations denote like elements, and:

FIG. 4 depicts an indirect analysis in accordance with the present invention.

FIG. 5 depicts a partial reference block analysis in accordance with the present invention.

DETAILED DESCRIPTION OF THE INVENTION

Figure 1:
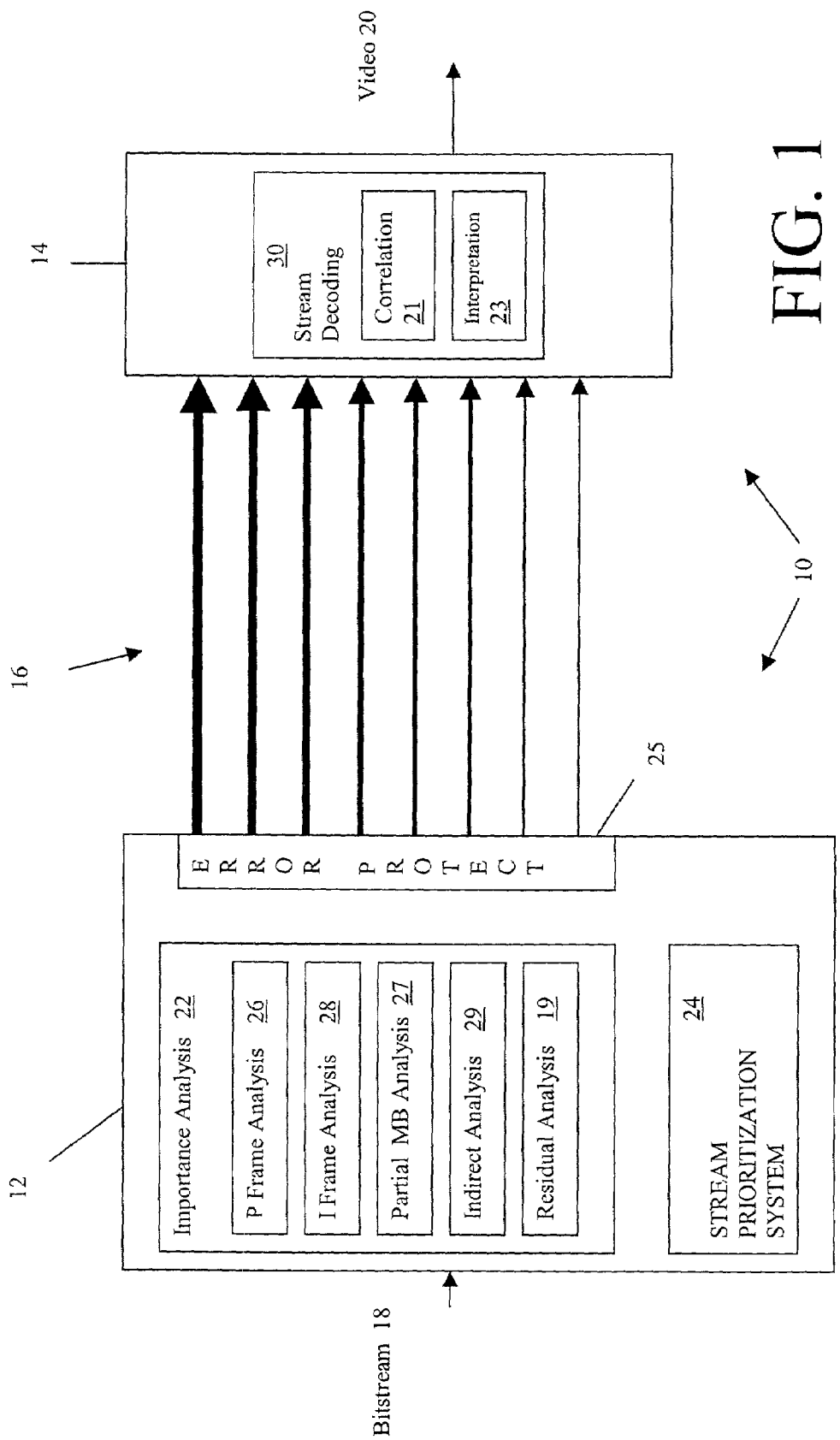
FIG. 1 depicts a block diagram of a multi-priority coding system in accordance with a preferred embodiment of the present invention.

Referring now to FIG. 1, a multi-priority coding system 10 is depicted. System 10 includes an encoder 12 for converting a bitstream 18 of MPEG data into a set of multi-priority streams 16, and a decoder 14 for interpreting the set of streams 16. Encoder 12 could be incorporated directly into an MPEG encoder, or alternatively, operate on already encoded MPEG data. Similarly, decoder 14 could be incorporated into an MPEG decoder or reside separately from an MPEG decoder. Each of the multi-priority streams 16 generated by encoder 12 are encoded with a different error protection scheme. Thus, for example, where the data is being transmitted over a channel susceptible to errors (e.g., the Internet), more important data can be afforded a greater amount of bandwidth to allow for a greater amount of error protection. On a receiving end, decoder 14 decodes the set of multi-priority streams 16 and outputs decoded video data 20. While this preferred embodiment is described as processing MPEG data, it should be understood that the invention could apply to any data compression scheme using predictive coding.

Encoder 12 comprises an importance analysis system 22 that examines macroblock data and determines the relative importance of each macroblock or set of macroblocks. Stream prioritization system 24 then assigns a relative priority to each macroblock or group of macroblocks based on the above analysis. Error protection system 25 then encodes the macroblock data with the appropriate error protection scheme for transmission as one of the plurality of multi-priority streams 16.

Importance analysis system 22 includes a P frame analysis system 26; an I frame analysis system 28; a partial macroblock analysis system 27; an indirect analysis system 29; and a residual analysis system 19. P frame analysis system 26 and I frame analysis system 28 examine macroblocks within P and I frames, respectively, to determine the relative importance of the macroblock data. Specifically, when a P or I frame is analyzed, system 26 or 28 systematically examines each macroblock, and a relative importance value is calculated as each macroblock (i.e., the "current macroblock") is examined. Importance is based on how often the current macroblock acts as a reference macroblock or partial reference block. (Note that for the purposes of this invention, the term "reference macroblock" may comprise a complete or partial reference block.)

Because P and I frames are used for forward and backward prediction, P frame analysis system 26 and I frame analysis system 28 analyze the motion vectors of previous and subsequent B frames, and a subsequent P frame (if applicable), to determine how often a current macroblock within either a P or I frame acts as a reference macroblock. An importance value is determined based on the number of target macroblocks that reference the current macroblock in either the P or I frame (i.e., the number of predictions). Examples of this process are described below with reference to FIGS. 2 and 3. (Note that certain P frames are followed by I frames, and therefore will not have a subsequent P frame to analyze.)

It should be appreciated that importance analysis system 22 can analyze individual macroblocks for their relative priority or sets of macroblocks (e.g., an entire frame or even a set of frames such as a group of pictures). In the case where sets of macroblocks are being analyzed for their importance, importance analysis system 22 would first group sets of macroblocks together based on a predetermined scheme. The importance value of the set is then determined by combining (e.g., summing, weighting, etc.) the importance values of each macroblock in the set. Priority is thus decided, for instance, based on cumulative importance of the macroblocks in each set.

Importance analysis system 22 further comprises a partial macroblock analysis system 27 that analyzes macroblock importance when reference macroblocks do not exactly coincide with the current macroblock being analyzed (i.e., when a current macroblock acts a partial reference block). Specifically, in cases where only part of a current macroblock is used as the reference macroblock, partial macroblock analysis system 27 computes the overlap (in terms of pixels) between the current macroblock and the reference macroblock. Thus, for example, if there were an overlap of 128 of 256 pixels, the importance value would be scaled by 50%. An example of this is described below with respect to FIG. 5.

An exemplary algorithm for calculating an importance value of a macroblock in a P frame would be as follows:

```
read a current macroblock;
set importance_value (of the current macroblock) = 0;
identify target macroblocks in B frames and the subsequent P
   frame that reference
the current macroblock;
   for each identified target macroblock:
      examine the corresponding reference macroblock;
      if the reference macroblock exactly coincides
      with the current macroblock,
         then importance_value = importance_value + 1;
      else
         compute pixel overlap (maximum is 16x16=256);
         importance_value = importance_value +
         (pixel overlap/256);
   end.
```

As an alternate embodiment, importance analysis system 22 may also include an indirect analysis system 29 that examines subsequent indirect predictions in determining importance. Indirect analysis system 29, while more computationally expensive, provides a more accurate valuation scheme. For example, in MPEG coding, macroblocks in I frames are used to "directly" predict P frame macroblocks, which in turn are used to "indirectly" predict subsequent P frame macroblocks and B frame macroblocks, and so forth. So in computing the importance of an I or a P frame macroblock, importance analysis system 22 may be used to not only examine direct predictions, but also examine subsequent indirect predictions. Thus, if an I macroblock acts as a reference for motion prediction for a macroblock in a P frame (direct prediction), and subsequently the P frame macroblock acts as a reference for other macroblocks in subsequent P and B pictures (indirect prediction), the importance values of the indirect predictions can be added, or otherwise factored into the importance values of the direct prediction. Accordingly, the relative importance among and between macroblocks in both I and P frames can be computed and prioritization can be based on such results.

As a further alternate embodiment, the importance value can be calculated (or further calculated) based on discrete cosine transform (DCT) residual values. A residual is the difference between a target macroblock and a reference macroblock. Thus, the smaller the residual, the closer the target macroblock matches the reference macroblock, and the greater the importance. Accordingly, residual analysis system 19 can examine the residual of each identified target macroblock and compute a function of each residual (e.g., the absolute or weighted sum of the coefficients). The importance value of the current macroblock can then be calculated based on, for example, a cumulative value of the residual computations from each target macroblock. It should be appreciated that this embodiment can be combined or used separately from the other embodiments described herein.

Once the importance values have been obtained, stream prioritization system 24 will assign priority to individual macroblocks or groups of macroblocks. In general, the greater the number of predictions for which the current macroblock is referenced by a target macroblock, the greater its priority, since the macroblock has a relatively higher importance for the visual quality of the decoded video stream.

In a preferred embodiment, since B frames are not used as references in predictive coding, the macroblocks in B frames are assigned the lowest priority. The macroblocks in the P frames are then assigned a relative higher priority, with the individual P frame macroblock data being prioritized in the manner described above. Finally, the macroblocks in the I frames are assigned the highest priority, again with the macroblock data being further prioritized based on the methods discussed above.

Decoder 14 includes a stream decoding system 30 that comprises a correlation system 21 and an interpretation system 23. Correlation system 21 correlates each of the multi-priority streams 16 with a particular error protection scheme, and interpretation system 23 interprets the data and packages it accordingly.

Figure 2:
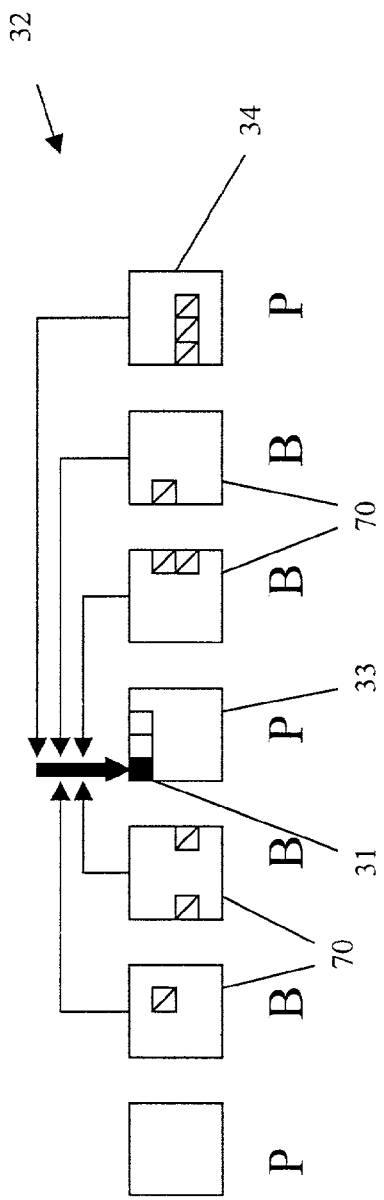
FIG. 2 depicts a P frame analysis in accordance with the present invention.

Referring now to FIG. 2, an example of how an importance value is calculated for a P frame macroblock is shown. A stream of MPEG video data 32 is depicted comprised of a sequence of frames (P,B,B,P,B,B,P). In accordance with the methods discussed above, the macroblock data within P frame 33 is being analyzed for its importance. Specifically, a current macroblock 31 is examined (as shown by the arrows) to determine how often the current macroblock 31 acts as a reference macroblock for target macroblocks in previous and subsequent B frames 70, and target macroblocks in the subsequent P frame 34. As can be seen, current macroblock 31 acts as a reference macroblock for nine target macroblocks (shown as squares with a diagonal line). The target macroblocks could be any one of the 16×16 blocks (not shown) in the neighboring frames 70 and 34. Assuming exact coincidence between the current macroblock 31 and the corresponding reference macroblock, the macroblock would be assigned an importance value of nine. Accordingly, macroblock 31 would be assigned a relative priority based on this value as compared to the other macroblocks in P frame 33. Note that in this case a subsequent P frame 34 follows P frame 33. In other cases (not shown), P frame 33 may be followed by an I frame, in which cases the subsequent I frame would not be analyzed for target macroblocks.

Figure 3:
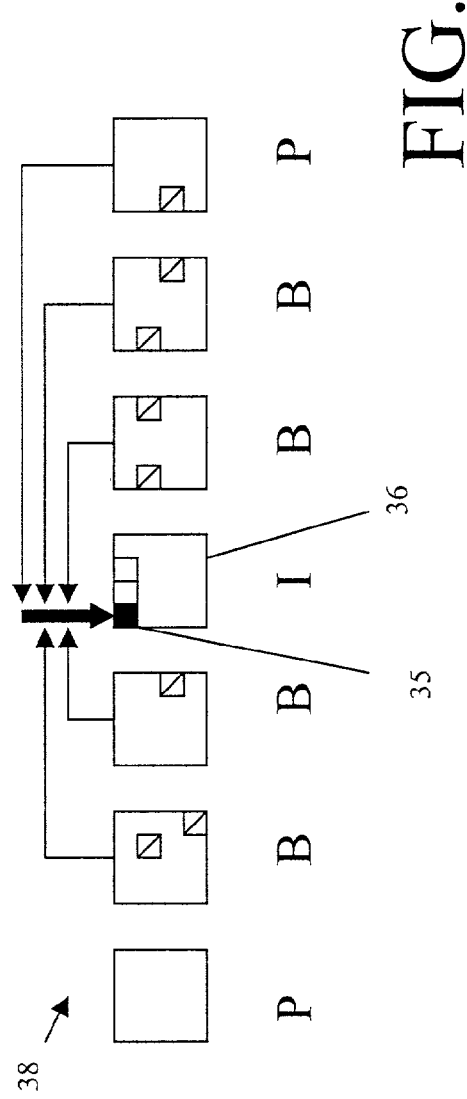
FIG. 3 depicts an I frame analysis in accordance with the present invention.

Referring now to FIG. 3, a similar example of how an importance value is calculated for an I frame macroblock is shown. In this case, a stream of frames 38 (P,B,B,I,B,B,P) is shown, and the macroblock data of I frame 36 is being analyzed to determine the relative priority of each macroblock in I frame 36. Here again, target macroblocks are identified by examining the motion vectors in the subsequent P frame and neighboring B frames. In this case, there are eight target macroblocks that are predicted by the current macroblock. Assuming exact coincidence between current macroblock 35 and the corresponding reference macroblock, an importance value of eight would be assigned to the current macroblock 35.

Referring now to FIG. 4, an example is shown of how an importance value is calculated for an alternate embodiment utilizing indirect analysis system 29. Specifically, a stream of frames 40 (P,B,B,P,B,B,P) is shown, with the macroblock data in P frame 42 being analyzed to determine relative priority. It can be seen that a current macroblock 41 acts as a reference macroblock for a total of five target macroblocks in both B frame 44 and P frame 46. In addition, the target macroblock 43 in P frame 46 further acts as an "indirect" reference macroblock for a total of six indirect target macroblocks in B frame 48 and P frame 50. Assuming no other target macroblocks in P frame 46 act as reference macroblocks, the importance value for current macroblock 41 of P frame 42 would be eleven. Although not shown, a more complex chain of indirect calculations could be utilized. For example, the target macroblocks in P frame 50 could be further examined to determine how often they act as reference macroblocks, etc.

Referring now to FIG. 5, an example is shown of how a partial reference block is taken into account by partial macroblock analysis system 27. Specifically, frame 52 (e.g., I or P) includes a current macroblock 54 that is being analyzed for importance, a reference macroblock 56 that does not exactly coincide with current macroblock 54, and an overlap portion 60 that represents the portion where macroblock 54 and reference macroblock 56 coincide. In this example, only 25% of the pixels in the current macroblock 54 are used as a reference macroblock for target macroblocks in other frames. Thus, the importance value for this particular macroblock would be scaled (e.g., by 25%) to account for the overlap.

It is understood that the systems, functions, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions.

Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method for assigning priority to streams of compressed video data, comprising:
   determining a relative importance of each macroblock in a video frame by reading a current P frame and examining motion vectors from previous and subsequent B frames and from a subsequent P frame, if it exists, to determine how often each macroblock in the current P frame acts as reference macroblock for target macroblocks in the B and P frames; and
   prioritizing each of the macroblocks in the video frame based on the relative importance.

2. The method of claim 1, further comprising determining how often target macroblocks in the subsequent P frame act as reference macroblocks.

3. The method of claim 1, further comprising:
   reading a current I frame; and
   examining motion vectors from the previous and subsequent B frames, and from the subsequent P frame, to determine how often each macroblock in the current I frame acts as the reference macroblock for the target macroblocks in the B and P frames.

4. The method of claim 3, further comprising determining how often the target macroblocks in the subsequent P frame act as the reference macroblocks.

5. The method of claim 1, further comprising:
   assigning B frame data a lowest relative priority;
   assigning P frame data a priority relatively higher than B frame data; and
   assigning I frame data a priority relatively higher than P frame data.

6. The method of claim 1, wherein if a current macroblock acts as a partial reference macroblock:
   determining an amount of pixel overlap between the current macroblock and a corresponding reference macroblock; and
   scaling the relative importance of the current macroblock based on the amount of pixel overlap.

7. The method of claim 1, comprising assigning each macroblock into one of a plurality of streams based on the prioritization step.

8. The method of claim 1, wherein the relative importance of each macroblock is further determined based on values of a plurality of residual discrete cosine transform (DCT) coefficients of the macroblock.

9. A method for assigning priority to af reams of compressed video data, comprising:
   determining an importance value for each inacroblock in a plurality of video frames by reading a current P frame and examining motion vectors from previous and subsequent B frames and from a subsequent P frame, if it exists, to determine how often each macroblock in the current P frame acts as a reference macroblock;
   grouping macroblocks into sets of macroblocks, and combining the importance values of the macroblocks within each set; and
   prioritizing each set of macroblocks based on the combined importance values.

10. The method of claim 9, wherein each set of macroblocks comprises a complete frame of video data.

11. The method of claim 9, further comprising:
    reading a current I frame; and
    examining motion vectors from the previous and subsequent B frames, and from the subsequent P frame, to determine how often each macroblock in the current I frame acts as the reference macroblock.

12. The method of claim 9, wherein each set of macroblocks comprises a group of pictures.

13. The method of claim 9, wherein if a current macroblock acts as a partial reference block:
    determining an amount of pixel overlap between the current macroblock and a corresponding reference macroblock; and
    scaling the relative importance of the current macroblock based on the amount of pixel overlap.

14. The method of claim 9, wherein the importance value of each macroblock is further determined based on values of a plurality of residual discrete cosine transform (DCT) coefficients of the macroblock.

15. A system for encoding streams of compressed video data, comprising:
    an importance analysis system for determining an importance value for each macroblock in a video framed by examining motion vectors from previous and subsequent B frames, and from a subsequent P frame if it exists, to determine how often each macroblock in a current P frame acts as a reference macroblock; and
    a system for prioritizing each of the macroblocks in the video frame based on the importance value determined for each macroblock.

16. The system of claim 15, wherein the importance analysis system determines how often macroblocks in the subsequent P frame are referenced by other video frames.

17. The system of claim 15, wherein the importance analysis system examines motion vectors from the previous and subsequent B frames, and from a subsequent P frame, to determine how often each macroblock in a current I frame acts as the reference macroblock.

18. The system of claim 17, wherein the importance analysis system determines how often target macroblocks in the subsequent P frame act as reference macroblocks.

19. The system of claim 15, further comprising an error protection system that adds error protection to a stream of macroblock data based on a priority assigned to each macroblock.

20. The system of claim 19, further comprising a stream decoding system that decodes the streams of macroblock data back into decoded video data.

21. The system of claim 15, further comprising a partial macroblock analysis system that computes an overlap between a current macroblock and the reference macroblock and scales the importance value based on the overlap.

22. The system of claim 15, further comprising a residual analysis system tat further determines the importance value of each macroblock based values of a plurality of residual discrete cosine transform (DCT) coefficients of the macroblock.

23. A decoder system for decoding multi-priority compressed video data, comprising:
- a system that correlates an error protection scheme to each of a plurality of data streams; and
- a system that interprets each data stream based on the error protection scheme;
- wherein the error protection scheme is determined by an prioritization system that prioritizes each data stream by analyzing a current P frame by examining motion vectors from previous and subsequent B frames, and from a subsequent P frame if it exists, to determine how often each macroblock in the current P frame acts as a reference macroblock.

24. A program product stored on a recordable media, that when executed, prioritizes streams of compressed video data, the program product comprising:
- means for determining an importance value for macroblock data in video frames by analyzing a current P frame by examining motion vectors from previous and subsequent B frames, and from a subsequent P frame if it exists, to determine how often each macroblock in the current P frame acts as a reference macroblock; and
- means for prioritizing macroblock data based on the determined importance values.

25. The program product of claim 24, further comprising means for analyzing a current I frame by examining motion vectors from the previous and subsequent B frames, and from the subsequent P frame, to determine how often each macroblock in the current I frame acts as the reference macroblock.

* * * * *